United States Patent
Marr, Jr.

(10) Patent No.: US 9,834,258 B2
(45) Date of Patent: *Dec. 5, 2017

(54) MODULAR RACK SYSTEM WITH GUSSETLESS JOINTS

(71) Applicant: Thule, Inc., Seymour, CT (US)

(72) Inventor: Edwin L. Marr, Jr., Providence, RI (US)

(73) Assignee: Thule, Inc., Seymour, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,477

(22) Filed: Jan. 5, 2017

(65) Prior Publication Data
US 2017/0113739 A1 Apr. 27, 2017

Related U.S. Application Data

(63) Continuation of application No. 14/315,151, filed on Jun. 25, 2014, now Pat. No. 9,566,914, which is a continuation of application No. 12/781,075, filed on May 17, 2010.

(60) Provisional application No. 61/179,163, filed on May 18, 2009.

(51) Int. Cl.
| | |
|---|---|
| *B60R 7/00* | (2006.01) |
| *B62D 33/02* | (2006.01) |
| *B60R 9/06* | (2006.01) |

(52) U.S. Cl.
CPC .......... *B62D 33/0207* (2013.01); *B60R 9/06* (2013.01)

(58) Field of Classification Search
CPC ... B60R 9/06; B60R 21/02; B60R 2021/0083; B60R 9/00; B62D 33/02

USPC ............ 224/405, 402, 403; 296/3; 410/150; 222/545, 555, 557
See application file for complete search history.

(56) References Cited

U.S. PATENT DOCUMENTS

| | | | |
|---|---|---|---|
| 4,138,046 A | 2/1979 | De Freze | |
| 4,405,170 A | 9/1983 | Raya | |
| 4,600,232 A | 7/1986 | Phillips | |
| 5,002,324 A * | 3/1991 | Griffin | ...................... B60R 9/00 224/405 |
| 5,037,152 A | 8/1991 | Hendricks | |

(Continued)

OTHER PUBLICATIONS

TracRac—CargoRac—publication date unknown.
(Continued)

*Primary Examiner* — Nathan J Newhouse
*Assistant Examiner* — Lester L Vanterpool
(74) *Attorney, Agent, or Firm* — Sterne, Kessler, Goldstein & Fox P.L.L.C.

(57) ABSTRACT

A rack system for attaching equipment to a vehicle includes an elongate base plate having a top surface, a bottom surface configured to engage a top surface of a sidewall of the vehicle, and a first aperture through the top surface and the bottom surface. An elongate upright coupled to the elongate base plate includes a perimeter surface defining an interior space, a first support rib disposed in the interior space, and a first end comprising a first female threaded bore extending in a longitudinal direction within the interior space of the elongate upright. A first threaded fastener is disposed through the first aperture in the elongate base plate and coupled within the first female threaded bore of the first end of the elongate upright.

20 Claims, 7 Drawing Sheets

(56) References Cited

U.S. PATENT DOCUMENTS

| | | | |
|---|---|---|---|
| 5,108,141 A * | 4/1992 | Anderson | B60R 9/00 211/182 |
| 5,137,320 A | 8/1992 | Christensen | |
| 5,143,415 A * | 9/1992 | Boudah | B60R 9/00 224/325 |
| 5,393,114 A * | 2/1995 | Christensen | B60R 9/00 248/558 |
| 5,494,327 A | 2/1996 | Derecktor | |
| 5,692,791 A | 12/1997 | Sulzer | |
| 5,725,137 A | 3/1998 | Macdonald | |
| D410,429 S | 6/1999 | Derecktor | |
| 5,927,782 A * | 7/1999 | Olms | B60P 3/40 211/182 |
| 6,186,571 B1 | 2/2001 | Burke | |
| D443,583 S | 6/2001 | Eggink | |
| 6,347,731 B1 | 2/2002 | Burger | |
| 6,513,849 B2 | 2/2003 | Carter | |
| D482,314 S | 11/2003 | McCoy et al. | |
| 6,843,395 B1 | 1/2005 | Martin et al. | |
| 6,971,563 B2 | 12/2005 | Levi | |
| 7,014,236 B2 | 3/2006 | Kerns | |
| 7,017,511 B2 * | 3/2006 | Fisher | G09F 17/00 116/173 |
| D552,529 S | 10/2007 | Klinkman | |
| D554,039 S | 10/2007 | Bulson | |
| 7,296,836 B1 | 11/2007 | Sabo | |
| 7,296,837 B2 | 11/2007 | Niedziela et al. | |
| 7,419,075 B2 | 9/2008 | Green | |
| D582,337 S | 12/2008 | Derecktor | |
| 7,464,977 B1 | 12/2008 | Price | |
| 7,497,493 B1 | 3/2009 | Thiessen et al. | |
| 7,594,478 B2 | 9/2009 | Karnes | |
| D623,576 S | 9/2010 | Lemieux | |
| 8,157,229 B2 | 4/2012 | Palermo | |
| 8,668,125 B2 * | 3/2014 | Williams | B60R 9/06 224/402 |
| 9,566,914 B2 * | 2/2017 | Marr, Jr. | B60R 9/00 |
| 2002/0163214 A1 | 11/2002 | Carter | |
| 2003/0002969 A1 | 1/2003 | Risser | |
| 2004/0211802 A1 * | 10/2004 | Levi | B60P 3/40 224/405 |
| 2006/0254997 A1 | 11/2006 | Pellegrino et al. | |
| 2008/0054037 A1 | 3/2008 | Niedziela et al. | |
| 2008/0100075 A1 * | 5/2008 | Derecktor | B60R 9/00 296/3 |
| 2009/0026784 A1 | 1/2009 | Green | |
| 2009/0166390 A1 | 7/2009 | Flaherty | |

OTHER PUBLICATIONS

TracRac—Utility Rack—Published Sep. 1, 1992.

Notice of Allowance and Fee(s) Due dated Nov. 15, 2010; in corresponding U.S. Appl. No. 29/366,569.

Assembly and Installation Instructions; Weather Guard, division of Knaak Mfg. Co.; Model 1225 Service Body Ladder Rack; Jul. 2004; Rev C; Part No. 24-0135.

Assembly and Installation Instructions; Weather Guard, division of Knaack Mfg. Co.; Model 1425 Aluminum Swivel Rack; Jul. 2004; Rev. A. Part No. 24-0145.

Installation Manual; Model 1200, Full Size Truck and Model 1205, Compact Size Truck; Weather Guard, division of Knaack Mfg. Co.; Nov. 2003; Part No. 24-0154.

American Van: Kargo Master All Aluminum Pro IV Truck Rack—URL: www.americanvan.com/catalog/stand_Huge_Split.cfm?FamilyID-365.

System One Pickup Truck Rack—URL: www.ladderracks.com/racks/pu_con_dtl.htm.

TracRac T-Rac G2 Truck Bed Rack—URL: www.realtruck.com/tracrac_t-rac_g2_truck_bed_racks/R142889P1C1T.

TracRac—NTEA Show Product Bulletin—LightRac, TracGuard, TracBox, T-Rac Pro; retrieved on Apr. 1, 2008.

* cited by examiner

MODULAR RACK SYSTEM WITH GUSSETLESS JOINTS

CROSS REFERENCE TO RELATED APPLICATIONS

This application is a continuation of application Ser. No. 14/315,151, filed Jun. 25, 2014, which is a continuation of application Ser. No. 12/781,075, filed May 17, 2010, and claims the benefit of is related to and claims priority from earlier filed provisional application Ser. No. 61/179,163, filed May 18, 2009, the entire contents thereof of each of the aforementioned applications is incorporated herein by reference.

BACKGROUND OF THE INVENTION

This invention relates generally to equipment for vehicles, such as pickup trucks, and more particularly to a releasably attachable and adjustable rack system having sliding connections and many other accessories for attaching to the overhead rack of the vehicle.

Vehicle racks and systems are very well known in the art. They can connect to various parts of the vehicle such as a cab and side walls of a truck bed. The rack systems that typically connect to a truck bed include a frame-like structure that includes a connection for attaching the rack to a vehicle as well as a structure for receiving accessories for customizing the rack system. For example, the rack system commonly includes a base or footing, a vertical tube or post, a cross-rail and a structure for connecting these components together.

For example, FIGS. 1-4 illustrate a known prior art rack system 10. FIGS. 1-4 are of interest because they employ components that are permanently welded together and use gusseted braces 12 to form the desired configuration. As in FIG. 1, the base 14 is welded to the bottom of an upright member 16, which is further reinforced by the gusseted brace 12. The top of the tube is also welded to a top saddle member 18, which is also further reinforced by a gusseted brace 12. As a result, a unitary rack member, that includes a base 14, an upright tube 16 and a saddle 18, is provided. This general construction can be seen in U.S. Pat. No. 7,014,236. This patent is of interest for its teachings of a vehicle rack system 10 that uses gusseted braces 12 to better secure rack members relative to each other and to provide a more rigid joint connection.

FIG. 2 is a close-up view of a prior art rack system 10 that includes a horizontal base member 14 that is clamped to the side wall 20 of a vehicle, such as a pick up truck. A vertical member 16 is permanently welded to the horizontal member 14 to provide an upright structure. A top saddle 18 is also permanently attached to the top of the vertical member 16 for receipt of a top rail 22 and other accessories thereon, as is well known in the art. Such a known construction can be seen in FIG. 3 where a top rail 22 can support equipment, such as ladders, and the like. The clamps 24 are adjustable to permit the horizontal member 14, and thereby the vertical member 16, to permit a customized installation, as can be seen in FIG. 4. Typically, a set of four horizontal members 14 and associated vertical members 16 are used to provide a pair of top rails 22 for location at a desired distance D from each other, as can be seen in FIG. 4. This construction is so well known in the art that further discussion herein is not required.

Although the prior art systems function acceptably as rack systems, they suffer from a number of disadvantages that make them undesirable. For example, a base horizontal member 14, a vertical upright member 16 and top saddle 18 are typically welded together, which results in a structure that is unacceptably large in size, which makes shipping very difficult because a large box must be used. This oversize packaging adds costs to shipping and, as a result, adds to the cost of the rack system. Also, such a prior art structure is very labor intensive because parts must be welded together. Such welding requires expensive parts and components and is a time consuming and expensive manufacturing process. Missed weld locations will also make the rack "non functional" out of the box forcing customer to return the product. Moreover, welded products add weight to the overall package thereby adding cost and, unfortunately, welds, best seen as 26 in FIG. 4, are susceptible to failure over time. If there is a failure, it is very difficult and expensive to replace only a portion of the entire welded structure. So, as a result, wasteful replacement of the entire welded unitary structure is typically required.

Also, a structure that is welded requires cumbersome gusseted braces 12 to supplement the welds so that acceptable rigidity can be achieved. These braces 12 add cost and further increase manufacturing time thereby further adding to the overall costs of production.

A permanently welded structure takes away most if not all of the customization options because the horizontal member, the vertical member and saddle are permanently fixed to each other in a given configuration. Thus, such a permanently welded structure makes it more difficult to provide options and flexibility for the user. As a result, prior art rack systems 10 are not conducive to a desirable modular rack system.

Finally, the permanent welds 26 and cross-braces 12 and gussets 12 of a rack system 10 are very unattractive in appearance as these welds 26 and braces 12 are readily visible.

In view of the foregoing, there is a demand for a rack system that eliminates welds to increase manufacturing capacity by removing the tedious welding process. There is a demand to directly cast in the reinforcing geometry into the base and the saddle to obviate the need for gusseted braces. There is a demand for a rack system that is even stiffer without gusseted braces by using a component that is thicker in the existing welded locations from the prior art rack system 10. There is also a need for a system that is modular so the user can customize and configure the system to what they need by mixing and matching horizontal bases, vertical upright members and top saddles, as well as top rails and accessories. A new rack system is desired that does not use a unitary welded structure to enable different variations of the horizontal member, vertical member and top saddle to be used and to obviate the need for expensive welding. Also, there is a need for a modular system so if one part of the system fails, only one small component is replaced rather than a larger unitary welded part. There is a also a need for a rack system that is more attractive and sleek in appearance and one that looks like a unitary structure but is actually a modular bolted component system.

SUMMARY OF THE INVENTION

The present invention preserves the advantages of prior art rack systems, such as those used in vehicles. In addition, it provides new advantages not found in currently available systems and overcomes many disadvantages of such currently available systems.

A modular rack system, for adjustably attaching equipment to a vehicle, includes a base mountable on a side wall of the vehicle. The rack system has a first wall that is disposed on and upwardly emanating from the top surface of the base that defines a lower seat. One end of a vertical member resides in the lower seat and is secured thereto. The other end of the vertical member resides in an upper seat defining by a downwardly depending wall from a saddle and is secured thereto. The first and second walls laterally stabilize the vertical member relative to the base and saddle to permit the base to be mounted to a side wall of a vehicle and a top rail to be secured to the saddle without the use of gussets or cross-braces.

Therefore, an object of the present invention is to provide a modular rack system that eliminates welds to increase manufacturing capacity by removing the tedious welding process.

Another object of the invention is to provide a rack system that directly formed, such as by casting or extrusion or the like, the required reinforcing geometry into the base and the saddle to obviate the need for gusseted braces.

A further object of the present invention is to provide a modular rack system that is even stiffer without gusseted braces by using a component that is thicker in the existing welded locations from the prior art rack system 10.

Yet another object of the present invention is to provide a rack system that is modular in nature so the user can customize and configure the system to suit their current needs by mixing and matching horizontal bases, vertical upright members and top saddles, as well as top rails and accessories.

Another object of the present invention is to provide a modular rack system that is devoid of any welding to reduce the overall costs of production of the rack system.

An object of the present invention is to provide a modular system so if one part of the system fails, only one small component will need to be replaced rather than one large unitary welded part.

Yet another object of the present invention is to provide a rack system that is more aesthetically appealing than prior art rack systems.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 5:
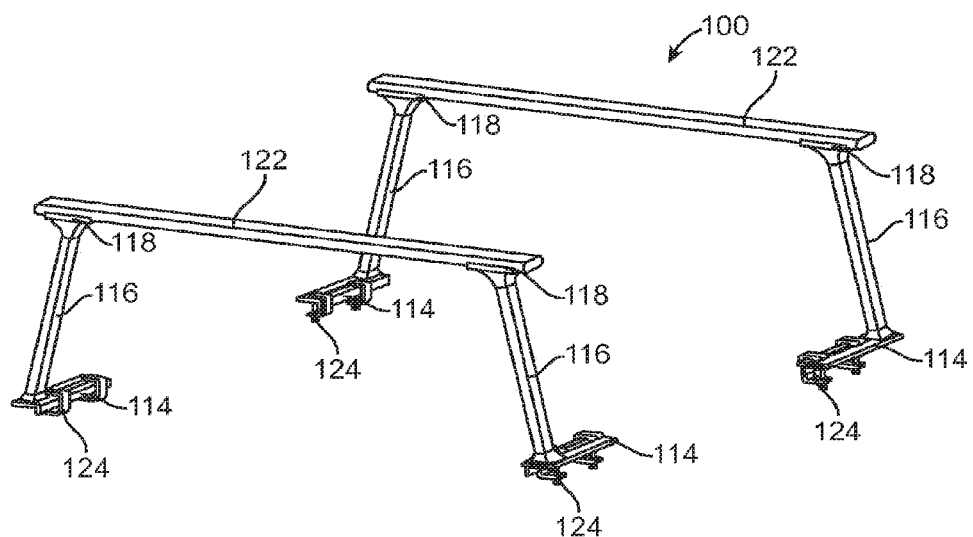
FIG. 5 is a diametric perspective view of the modular rack system of the present invention.
Figure 6:
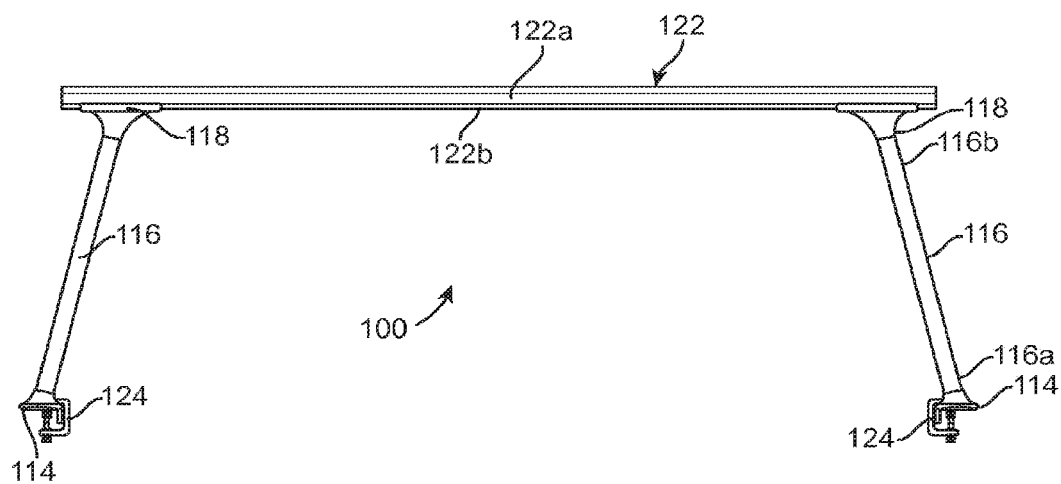
FIG. 6 is an elevational view of the modular rack system of FIG. 5.
Figure 7:
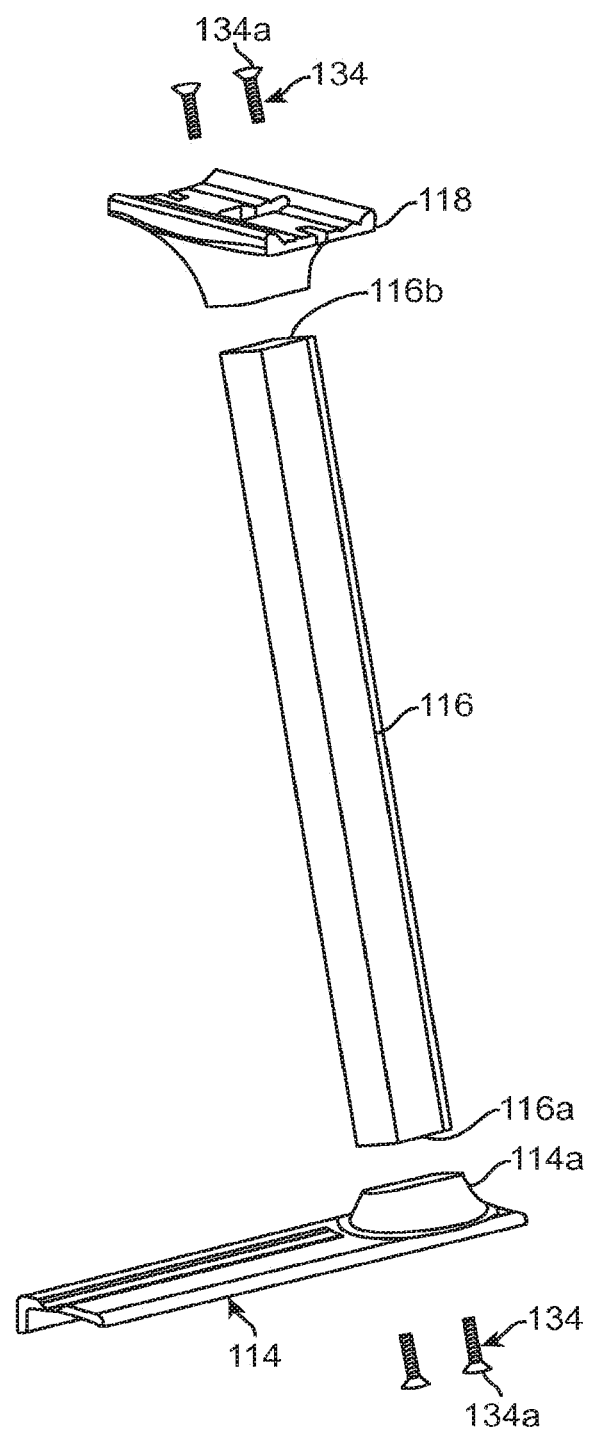
FIG. 7 is a an exploded perspective view of the horizontal base member, tubular vertical member and top saddle construction.
Figure 8:
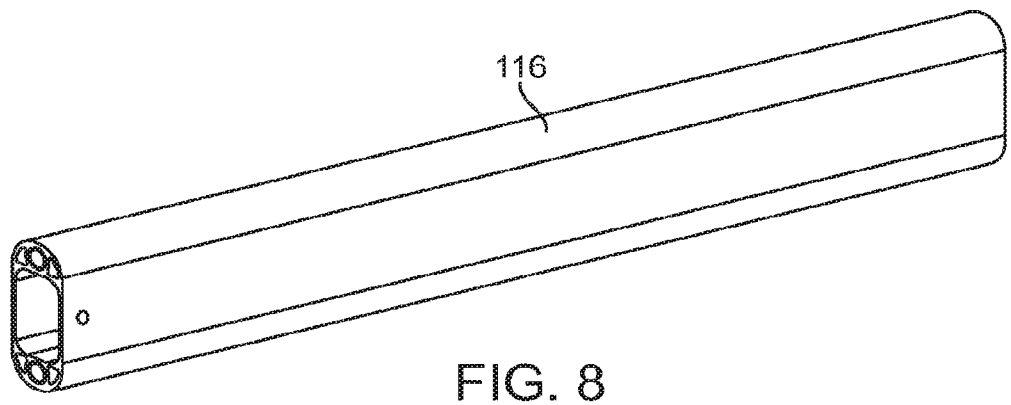
FIG. 8 is a perspective view of a vertical tube used in the invention of FIG. 5.
Figure 9:
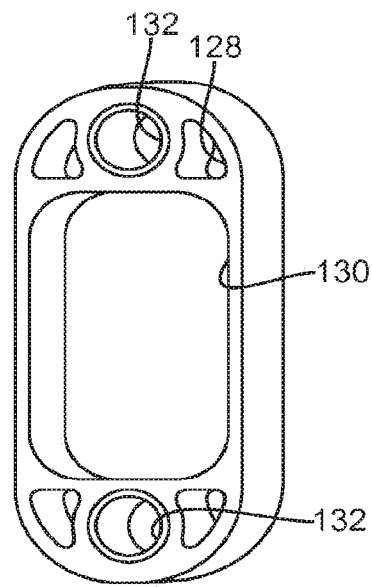
FIG. 9 is a end perspective view of the vertical tube of FIG. 7.
Figure 10:
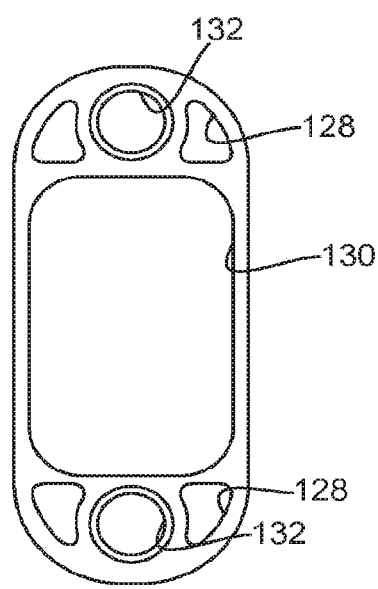
FIG. 10 is a front elevational view of the vertical tube of FIG. 7.

The modular rack system 100 of the present invention is shown in detail in FIGS. 5-28. Generally, FIGS. 5 and 6 show the overall new modular rack system 100 while FIGS. 8-10 show the structure of unique vertical upright tubular member 116 and FIGS. 11-18 show the horizontal base member 114 and its interconnection to the vertical upright tubular member 116. FIGS. 19-23 show the structure of the top saddle 118 in detail. FIGS. 24-28 show the interconnection of the top saddle 118 to the top rail 122 to complete the rack system 100 of the present invention. The top rail 122 is preferably of a length that can span across the distance between two side walls 20 of a vehicle. For example, the top rail 122 may be of a length of 65" inches to 69.5" inches, but can be any length to meet the given application at hand. FIG. 7 shows an exploded view of the three components of the horizontal base member 114, the vertical tubular member 116 and top saddle 118.

Figure 1:
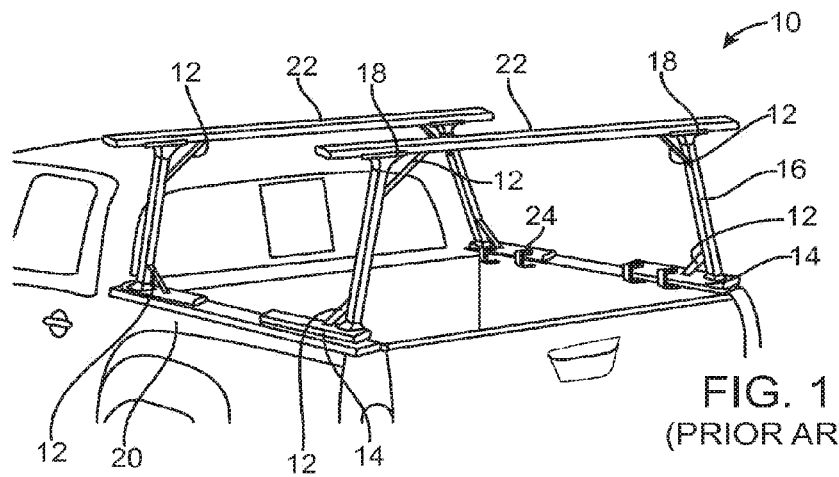
FIG. 1 is rear perspective view of a prior art rack system that with a top rail that is reinforced by a gusseted brace.
Figure 2:
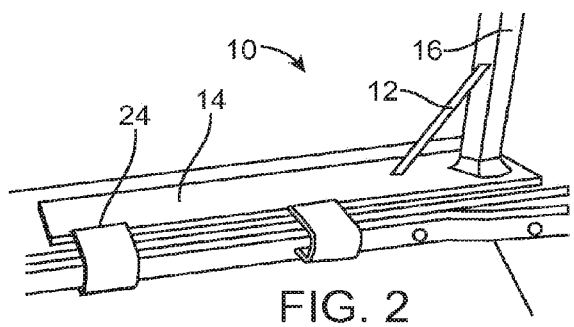
FIG. 2 is a close up view of a base of a prior art rack system that is reinforced by a welded gusseted brace.
Figure 3:
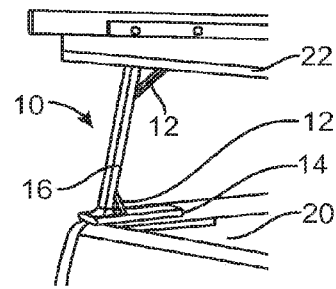
FIG. 3 is a prior art rack system rear perspective view of a base that is reinforced with a welded gusseted brace.
Figure 4:
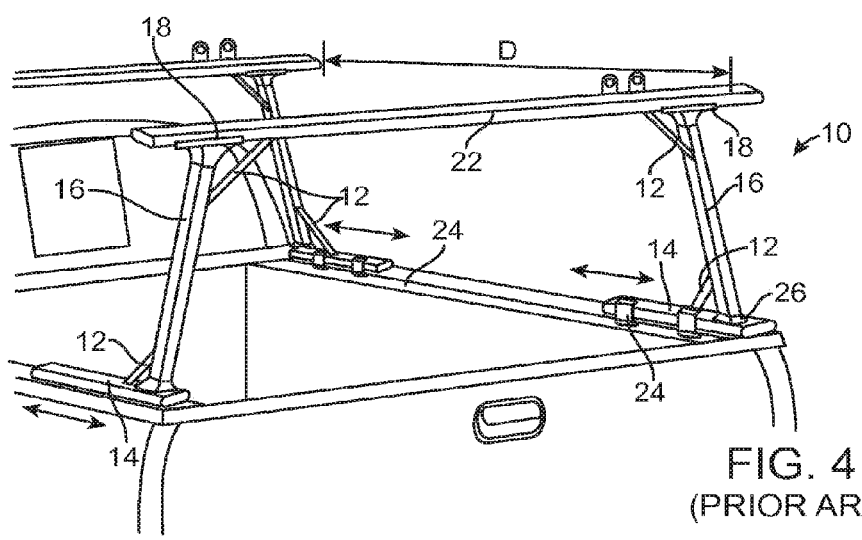
FIG. 4 is rear perspective view of another prior art rack system that uses gusseted brace reinforcement for the base and rails.

Referring first to FIGS. 5 and 6, the overall rack system 100 is shown to include a horizontal member 114 that serves as a base that communicates with a clamp assembly 124 to secure the rack system 100 to a support, such as a side wall 20 of a truck bed, as can be seen in FIG. 3. Any type of clamp system 124 may be employed by the present invention as long as the horizontal base member 114 is secured to the side wall 20. Preferably, the clamp system 124 is releasably secured to the side wall 20 of a vehicle so that the horizontal base member 114 can be positioned at any desired location along the length of the side wall 20. However, the frontmost vertical members 116 are recommended to sit as far forward as possible behind a rear window of a vehicle and the rearmost vertical members 116 to sit as far back as possible to optimize structural rigidity. Further, this enables the opposing horizontal base members 114 to also be adjusted so that the location of the entire rack structure 10 can be located where desired along the length of the side walls 20. In turn, an assembled rack 100 can be located where desired.

Details of the horizontal base member 114 will be discussed below in connection with FIGS. 11-18.

Still referring to FIGS. 5-7, a vertical upright member 116, such as in the form of a tube, is received in and secured to the horizontal base member 114 at its bottom end 116*a*. It should be noted that both ends of the vertical upright members 116*a*, 116*b* are identical to facilitate installation. Details of the vertical upright member 116 will be discussed in detail below in connection with FIGS. 8-10.

The top end 116*b* of the vertical upright member resides in and is secured to a top saddle 118. Details of the top saddle 118 will be discussed in detail below in connection with FIGS. 19-22. The interconnection of the vertical upright member 114 to the top saddle will be discussed in connection with FIGS. 24-28 below.

As can be best seen in FIGS. 5-7, a top rail 122 is releasably connected to a top saddle 118 to complete one half of the modular rack system of the present invention. The opposing side of the rack system 100 is constructed in the same fashion and is a mirror image thereof. Therefore, one half of a rack includes two horizontal base members 114, two vertical upright members 116 and two top saddles 118 and one top rail 122 spanning thereacross. It should also be understood that at least two entire racks are preferably used in spaced apart relation to each other to provide at least two top rails 122. FIG. 5 shows two racks with two top rails 122 to form the rack system 100 of the present invention. This general configuration is well suited to provide a support for items on the top surface 122*a* of the top rails 122. Additional accessories (not shown) can also be attached to the top surface 122*a* and bottom surface 122*b* of the top rails 122. For ease of discussion herein, the weldless and modular interconnection of a single horizontal base member 114, single vertical upright member 116 and top saddle 118 will be addressed herein. It should be understood that the other connections to complete and entire rack system 100 are the same and, therefore, need not be discussed, although are covered by the present invention.

First, the construction of the vertical upright member 116 will be discussed in detail. FIG. 8 shows the unique vertical upright member 116 of the present invention. A tubular construction is preferably formed by extrusion but can be formed by other processes, such as casting, and the like. As can best be seen in FIGS. 9 and 10, the tubular vertical member 116 is not merely a hollow or solid tube as in the prior art but rather a preferably extruded part. The walls of the extrusion are preferably 0.080" on the perimeter, 0.080" on the support ribs and 0.140" around the female threads but may be any desired thickness. This vertical member 116 is preferably extruded from aluminum but may be formed of any material. The vertical upright member 116 preferably has a general rectangular cross-sectional shape with the short sides of the rectangular profile being rounded. The rounded profile provides an attractive aesthetic appearance. As in FIGS. 9 and 10, the height of the vertical member 116 is preferably 3.000" inches and the width is preferably 1.250" inches.

Use of an extrusion process enables a uniquely configured part to be provided that has a number of apertures formed, generally referred to as 128, that longitudinally run throughout the entire length of the part. This construction permits large voids 130 to be formed to reduce the overall weight of the part, which results in a large cost savings. Further, the longitudinally running circular apertures 132 are well-suited to be tapped to receive fasteners therein.

For this purpose, preferably, a pair of such circular apertures 132 are provided that are tapped using known methods to turn the extruded apertures into females threaded bores 132 that are suitable for receipt of fasteners 134, such as bolts, as will be described below.

FIGS. 11-18, along with FIG. 7, show the interconnection of a horizontal base member 114 to the extruded tubular vertical member 116. Turning first to FIGS. 15-18, the horizontal base member 114, in which the tubular vertical member 116 will be installed, has an upstanding wall 114*a* that defines a seat 114*b*, which defines a floor 114*c* for receipt of a first end 116*a* of the tubular vertical member 116 therein. The upstanding wall 114*a* is dimensioned to accommodate the size and configuration of the cross-sectional profile of the bottom end 116*a* of vertical member 116 shown in FIGS. 9 and 10. The appearance of the interconnection of the vertical member 116 into the upstanding wall 114*a*, as in FIG. 11, has a very aesthetically pleasing appearance, particularly because it is devoid of any welds and all fastening connections are completely hidden. This also eliminates the need for a gusset.

The horizontal member 114 includes a primary plate 114*d* to support the upstanding wall 114*a* and provide a floor 114*c* upon which the lower end 116*a* of the vertical member 116 will sit. This primary plate 114*d* may be of any size and configuration as long as it can sit on top of a side wall 20 of a vehicle and be secured thereto. For example, the length of the primary plate is preferably 16.0" inches but can be of any length, as desired. A secondary plate 114*e* is optionally included, which downwardly depends from the edge of the primary plate 114*d* that facing toward the center of the vehicle. This secondary plate 114*e* helps secure the horizontal member 116 in place on the top of a side wall 20 of a vehicle.

Figure 17:
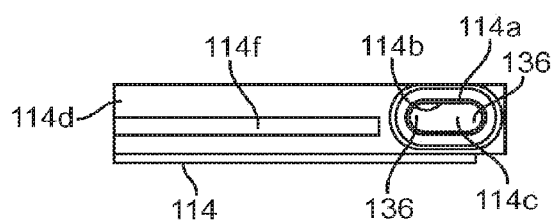
FIG. 17 is a top view of the base of the sliding lock assembly.
Figure 18:
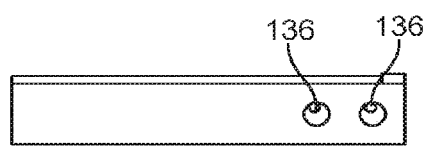
FIG. 18 is a bottom view of the base of the sliding lock assembly.

As seen in FIGS. 17 and 18, a pair of pass-through apertures 136 is provided through the floor 114*c* of the primary plate 114*d* that resides within the upstanding wall 114*a*. This pair of apertures 136 matches with the threaded bores 132 on the end of the vertical upright member 116. The floor 114*c* is configured at an angle, preferably 13.5 degrees, so that the vertical upright 116 closely matches the cab angle of the truck. Also, this angled positioning provides a stronger geometry than if the uprights were at 90 degrees.

Figure 11:
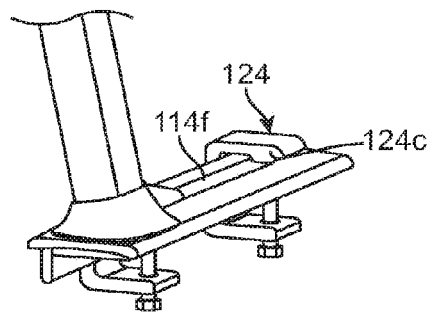
FIG. 11 is a front perspective view of sliding lock assembly in accordance with the modular rack system of the present invention.
Figure 12:
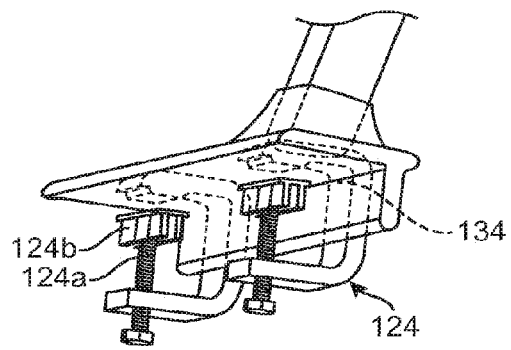
FIG. 12 is a rear perspective view of the sliding lock assembly.
Figure 13:
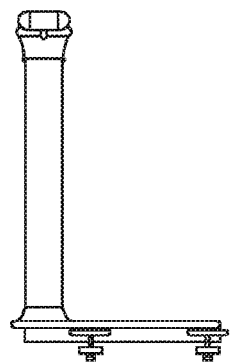
FIG. 13 is a right elevational view of the sliding lock assembly.
Figure 14:
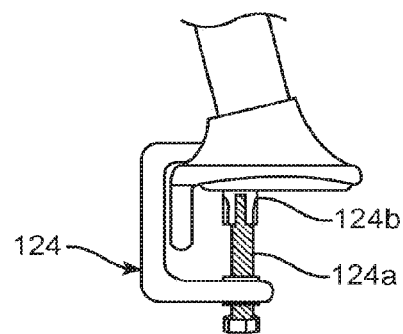
FIG. 14 is a front elevational view of the sliding lock assembly.
Figure 15:
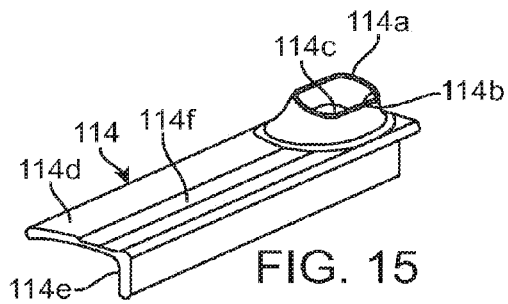
FIG. 15 is a perspective view of the base of the sliding lock assembly.
Figure 16:
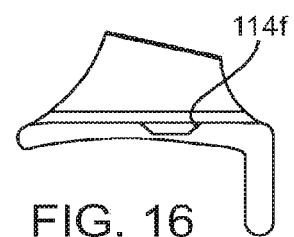
FIG. 16 is a front side elevational view of the base of the sliding lock assembly.

An end of the vertical upright member 116 is inserted into the seat 114*b* defined by the upstanding wall 114*a* to effectuate matching of the respective apertures 136 and threaded bores 132. Referring to FIG. 11, bolt fasteners 134 are inserted up through the pass-through apertures 136 in the primary plate 114*d* and into threaded engagement with the threaded bores 132 in the end 116*a* of the vertical upright member 116. The male threaded bolts 134 are tightened to secure the horizontal base member 114 to the vertical upright member 116 without welding. In fact, this connection and all connections are preferably carried out by the end user.

As can be best seen in FIG. 18, the bottom side of the primary plate 114d of the horizontal member 114 has countersunk holes 136 so that the head 134a of the bolt 134 residing therein is flush with or below the bottom surface of the base 114. Preferably, a C' sink hole with flat head cap screws are preferably used to achieve self-alignment with the casting and the mating features. So, as in FIG. 14, the base 114 can rest against the top of a side wall of a truck bed or other support surface without interference. A number of clamps 124, such as 8 clamps per rack, are preferably used, as to secure the base to the top edge of wall of truck bed. A C-clamp construction 124 with a threaded bolt 124a and foot 124b can be used. The clamps 124 shown are by way of example only. Any type of suitable clamping system may be used. In this particular example, a channel 114f can be formed in the top surface of the primary plate 114d to receive a top pad 124c of the C-clamp 124 to help secure the C-clamp 124 in place. This structure can be seen in FIGS. 11, 12, 15-17.

The horizontal base member 114 is preferably cast but can be formed by any process. The horizontal base member includes a geometry about the seat 114b that has, preferably, an upward sloping configuration toward the seat 114b (downwardly sloping away from the seat) to provide lateral stability and rigidity. This allows for gussets to be completely eliminated overcoming a disadvantage in the prior art. The upstanding wall 114a preferably positions the vertical upright member 116 at an angle less than 90 degrees to add further strength to the overall construction 100. For example, an angle of 76.5 degrees is preferably used. As a result of the geometry of the upstanding side wall 114a and the thickness of the seat 114b of the horizontal base member 114, there is no need for additional gusseted braces. In general, the width of the upstanding wall 114a of the horizontal base member 114 is preferably larger at its bottom than at its top.

Both ends 116a and 116b of the tubular vertical member 116 are equipped with tapped holes 132. As above, a first, lower end 116a is secured to the horizontal base member 114, as seen in FIG. 7, 11-13, for example. FIGS. 24-28 show the interconnection of the second, upper end 116b of the vertical tubular member 116 to a top saddle 118. As will be discussed in detail below, a top rail 122 is then attached to top saddles 118 to complete the rack system 100.

Figure 19:
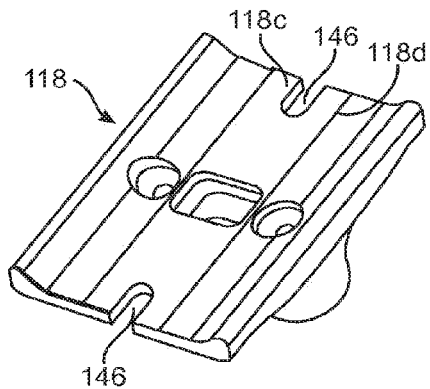
FIG. 19 is a top perspective view of the saddle of the modular rack system of the present invention.
Figure 20:
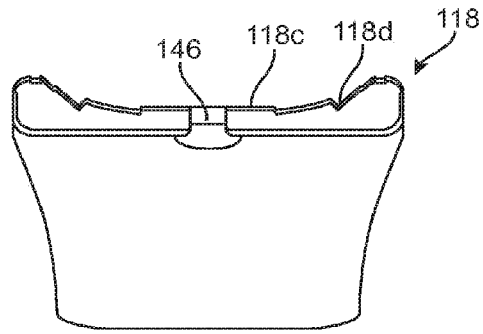
FIG. 20 is a front view of the saddle.
Figure 21:
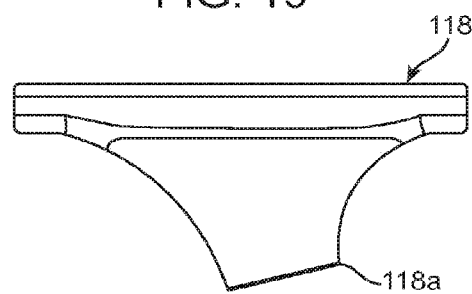
FIG. 21 is a side view of the saddle.
Figure 22:
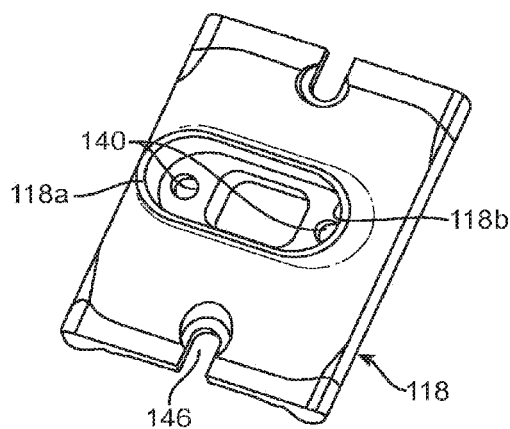
FIG. 22 is a bottom perspective view of the saddle.
Figure 23:
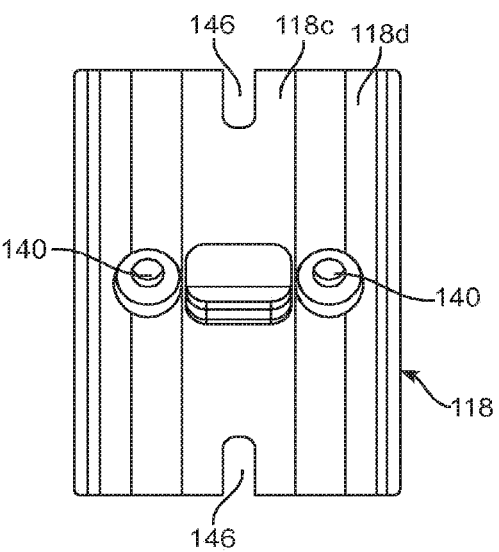
FIG. 23 is a top view of the saddle.
Figure 24:
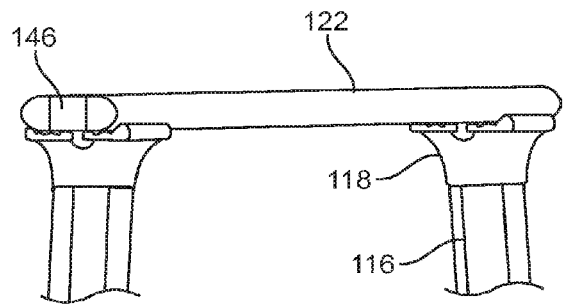
FIG. 24 is a perspective view of a top rail secured to a vertical tube using the unique saddle of the present invention.
Figure 25:
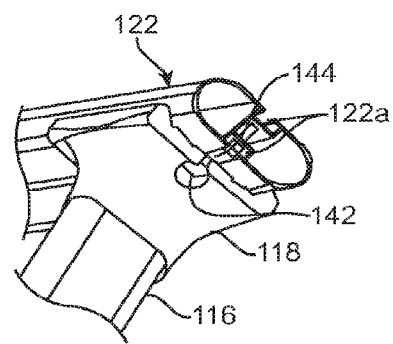
FIG. 25 is a bottom perspective view of the interconnection of FIG. 24.
Figure 27:
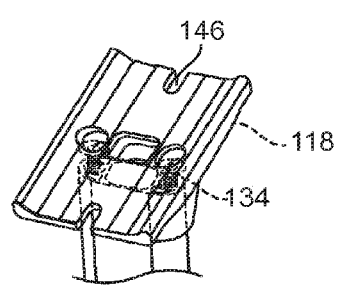
FIG. 27 is a perspective view of a saddle, shown in shadow for illustrative purposes, attached to a vertical tube.
Figure 28:
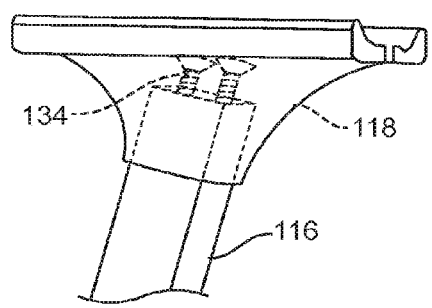
FIG. 28 is a side view of the saddle and vertical tube of FIG. 26.

Turning next to FIGS. 19-23, details of the construction of the saddle 118 is shown. The top saddle 118 is provided as an upper interconnection interface between the tubular vertical member 116 and the top rail 122. In similar fashion to the horizontal base member 114, the top saddle 118 includes a wall 118a to define a seat 118b that receives the top end 116b of the tubular vertical member 116 so that the tapped holes 132 on the top end 116b of the tubular vertical member 116 align with the pass through holes 140 shown in FIG. 22. This is very similar to the structure for securing the bottom end 116a of the vertical tubular member 116 into the seat 114b on the horizontal base member 114. FIGS. 19 and 23 show the opposing side of the top saddle 118 where the apertures 140 have a countersunk configuration so the heads 134a of the fastening bolts 134 remain flush to or sit below the opposing surface, which is configured to receive and secure to a top rail 122. C' Sink holes with flat head cap screws are preferably used to allow the bolt to self align with the casting and mating features. FIGS. 27 and 28 illustrate a side view of the interconnection of a top saddle 118 to the upper end 116b of the tubular vertical member 116.

The seat 118b is formed by a downwardly depending wall 118a that is similar to the upstanding wall 114a found on the horizontal base member 114. The downwardly depending wall 118a is dimensioned to accommodate the size and configuration of the cross-sectional profile of the top end of the vertical member 116b shown in FIGS. 9 and 10. The appearance of the interconnection of the vertical member 116 into the downwardly depending wall 118a, as in FIG. 25, has a very aesthetically pleasing appearance, particularly because it is devoid of any welds and all fastening connections are completely hidden. This also eliminates the need for a gusset. The angle of the positioning of the downwardly depending wall 118a is preferably complementary to the angle of the upstanding wall 114a so that top surface 118c of the top saddle 118 remains parallel to the ground so that a top rail 122 mounted thereto also remains positioned parallel to the ground. Different combinations of angles are possible although a top rail 122 that is parallel to ground is preferred.

Figure 26:
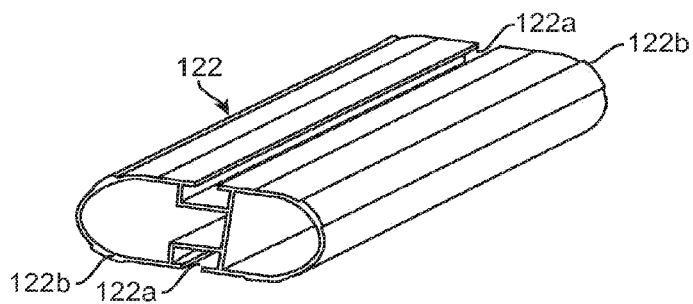
FIG. 26 is a perspective view of a top rail used with the present invention.

With the top saddle 118 (and top saddle 118 on the opposing side of the rack) secured to the upper end 116b of the tubular vertical member 116, the top rail 122 may be installed. The interconnection of the top rail 122 to the top saddles 118 is illustrated in connection with FIGS. 24-26. FIG. 26 shows a perspective view of the top rail 122 that is preferably used in the present invention. As can be seen, a channels 122a runs longitudinally along the length of the top rail on both the top and bottom sides thereof. A bolt 142 is partially threaded into a nut 144 and then the nut 144 is slid laterally into the channel 112a on the bottom side of the top rail 122 with the head of the bolt 142 located within a bolt seat 146 on the top saddle 118. A second bolt 142 and nut 144 are threaded and similarly threaded into the channel 122a on the opposing side of the top rail 122 with the head of a bolt 142 residing in the bolt seat 146 on that opposing top saddle 118. The opposing top saddle 118 is also similarly configured. At this point, the top rail 122 can still freely slide along the top saddles 118. The grooving 118d on the top surface of the top saddle 118 is configured to be complementary to the grooving 122b on the outer surface of the top rail 122 to help secure the top rail 122 in place, particularly during initial installation. Once the position of the top rail 122 is desired relative to the top saddles 118, the rail bolts 142 can be tightened thereby pulling the top rail 122 into secure engagement with the top saddles 118. Accessories can be attached to this bottom channel 122a or to the channel 122a on the top side of the top rail 122 using the same interconnection construction as the top saddle 118 to the bottom surface of the top rail 122.

Finally, a cosmetic end cap 146 is installed onto the free ends of the top rail 122. This end cap 146 can be secured in many different ways, such as by providing a tab with a female threaded bore that emanates from the end cap to engage with a bolt that passes through the top rail itself (not shown). The cosmetic end caps 146 also help prevent accessories from falling out with any item held within the channel 122a.

Although preferred in accordance with the present invention, the above structure for interconnecting the tubular vertical member 116 to a saddle 118 is one of many that can be employed. Other interconnection structures are considered within the scope of the present invention.

The sides of the top saddles 118 are configured with a geometry profile, in similar fashion to the horizontal base member 114 as above, to obviate the need for gusseted braces. The profiling is preferably similar to that of the horizontal base members 114 but may be modified to suit the application at hand. The horizontal base members 114 and top saddles 118 are configured for left and right hand location, as can be seen in FIG. 7 to provide both sides of the support for top rail 122.

The horizontal base members 114 and the top saddles 118 are preferably made of cast aluminum and the vertical tubular members and the top rails 122 are preferably made of extruded aluminum. However, other suitable materials can be used and still be within the scope of the present invention.

Generally, the interconnection of the horizontal base member 114 to the bottom end 116*a* of the extruded tubular vertical member 116 and the top saddle 118 to the top end 116*b* of the extruded tubular vertical member 116 are similar although the overall configuration of the horizontal base member 114 and the top saddle 118 are different as they interconnect to different structures. The horizontal base member 114 is preferably elongated because it typically rests on the elongated top edge of the side wall 20 of a truck bed. The top saddle 118 includes a top surface that is well suited to receive a top rail 122 that can support and receive accessories, and the like.

The rail system 100 of the present invention enables a modular construction that can ship to the point of purchase or to the consumer in a compact package where the horizontal base members 114, tubular vertical members 116, top saddles 118 and top rails 122 (and other parts) are separate pieces and in an unassembled form.

In view of the foregoing, the unique modular rack system 100 of the present invention does not include welded parts, gussets or braces. Welds are eliminated to increase manufacturing capacity by avoiding the tedious welding process. Reinforcing geometry is cast into the horizontal base member 114 and the top saddle 118 to obviate the need for separate gusseted braces. The rack system 100 of the present invention is even more stiff that the prior art racks with gusseted braces by using a component that is thicker in the existing welded locations from the prior art rack system 10. In the present invention, thicker areas on the saddle 118 and the horizontal base 114 are provided to the needed support and rigidity to obviate the need for gussets. This is in contrast to the same regions in prior art constructions that are not thicker but are simply welded. However, the prior art welded constructions are still not strong enough thereby still requiring the use of gussets and braces. Thus, the configuration of the present invention, with its thicker regions, is a significant advance over prior art constructions.

The rack system 100 of the present invention is modular so the user can customize and configure the system to what they need by mixing and matching bases, tubes and saddles (as well as top rails and accessories). In the event one part of the system fails, only one small component is replaced rather than the larger unitary welded part. The rack system 100 of the present invention is more attractive and sleek in appearance than prior art devices. Moreover, the inventive rack system 100 has the appearance of a unitary structure but is actually a modular bolted component system.

It would be appreciated by those skilled in the art that various changes and modifications can be made to the illustrated embodiments without departing from the spirit of the present invention. All such modifications and changes are intended to be covered by the appended claims.

The invention claimed is:

1. A rack system for attaching equipment to a vehicle, comprising:

an elongate base plate having a top surface, a bottom surface configured to engage a top surface of a sidewall of the vehicle, and a first aperture through the top surface and the bottom surface;

an elongate upright coupled to the elongate base plate, the elongate upright comprising:

a perimeter surface defining an interior space, a first support rib disposed in the interior space, and a first end comprising a first female threaded bore extending in a longitudinal direction within the interior space of the elongate upright; and a first threaded fastener disposed through the first aperture in the elongate base plate and coupled within the first female threaded bore of the first end of the elongate upright.

2. The rack system of claim 1, wherein the first aperture defines a counter-sunk bore on the bottom surface of the elongate base plate.

3. The rack system of claim 1, further comprising an interconnection member disposed on the top surface of the elongate base plate.

4. The rack system of claim 3, wherein the interconnection member couples the first end of the elongate upright to the elongate base plate.

5. The rack system of claim 3, wherein the interconnection member is integrally formed with the elongate base plate.

6. The rack system of claim 3, wherein a perimeter of the interconnection member surrounds the first aperture.

7. The rack system of claim 1, wherein the elongate base plate further comprises a second aperture through the top surface and the bottom surface, wherein the first end of the elongate upright comprises a second female threaded bore extending in the longitudinal direction within the interior space of the elongate upright, and wherein a second threaded fastener is disposed through the second aperture in the elongate base plate and coupled within the second longitudinal female threaded bore of the first end of the elongate upright.

8. The rack system of claim 7, wherein the first female threaded bore and the second female threaded bore are disposed opposite each other within the interior space of the elongate upright.

9. The rack system of claim 7, wherein the first support rib is disposed between the first female threaded bore and the second female threaded bore within the interior space of the elongate upright.

10. The rack system of claim 7, further comprising a second support rib disposed in the interior space of the elongate upright, wherein the first support rib and the second support rib define a central void within the interior space.

11. The rack system of claim 10, wherein the first female threaded bore is disposed between the perimeter surface and the first support rib, and the second female threaded bore is disposed between the perimeter surface and the second support rib.

12. The rack system of claim 1, wherein the elongate upright comprises extruded aluminum, and wherein the first longitudinal female threaded bore is tapped into the extruded aluminum.

13. The rack system of claim 1, further comprising a secondary plate portion extending downward from an edge of the elongate base plate and configured to engage a side surface of the sidewall of the vehicle.

14. The rack system of claim 1, further comprising a clamping assembly configured to couple the base to the sidewall of the vehicle.

15. A modular rack system for adjustably attaching equipment to a vehicle, the vehicle having a pair of spaced apart side walls and a bottom wall which together defines an open bed, the modular rack system comprising:
- a base mountable on a side wall of the vehicle, the base having a bottom surface engageable with the side wall of the vehicle and a top surface opposite the bottom surface;
- means for securing the base to the side wall of the vehicle;
- a first wall disposed on the top surface of the base defining a lower seat;
- a vertical member having a first end and a second end, the first end of the vertical member coupled with the lower seat, wherein the first end of the vertical member has a first female threaded bore therein; and
- a first fastener routed through a first pass-through aperture and into threaded engagement with the first female threaded bore thereby securing the base to the first end of the vertical member, wherein the first pass-through aperture defines a counter-sunk bore on the bottom surface of the base.

16. The modular rack assembly of claim 15, further comprising a second fastener routed through a second pass-through aperture and into threaded engagement with a second female threaded bore in the first end of the vertical member, wherein the second pass-through aperture defines a second counter-sunk bore on the bottom surface of the base.

17. The modular rack assembly of claim 15, further comprising:
- a top rail supported by the vertical member, the top rail having a top surface for receiving equipment thereon.

18. A rack system for attaching equipment to a vehicle, comprising:
- a base configured to be mounted on a sidewall of the vehicle, wherein the base comprises a top surface, a bottom surface configured to engage the sidewall, and a first aperture through the top surface and the bottom surface, wherein the first aperture defines a counter-sunk bore on the bottom surface of the base;
- a collar coupled to the top surface of the base;
- an elongate member having a first end and a second end, wherein the first end comprises a first female threaded bore therein, and wherein the first end is coupled to the base by the collar; and
- a first threaded fastener disposed through the first aperture in the base and coupled with the first female threaded bore of the first end of the elongate member.

19. The rack system of claim 18, further comprising a saddle disposed at the second end of the elongate member, and a top rail coupled to the saddle.

20. The rack system of claim 18, wherein the collar is integrally formed with the base.

* * * * *